United States Patent
Hansen et al.

(10) Patent No.: US 7,818,236 B2
(45) Date of Patent: Oct. 19, 2010

(54) SYSTEM FOR AGGREGATING EXECUTIONS IN A COMMUNICATION NETWORK FOR SECURITIES TRANSACTIONS AND THE LIKE

(75) Inventors: Peter Hansen, Stamford, CT (US); Nicolay Landmark, Hall Green (GB); Lars Kragh, Stamford, CT (US)

(73) Assignee: NYFIX, Inc., New York, NY (US)

( * ) Notice: Subject to any disclaimer, the term of this patent is extended or adjusted under 35 U.S.C. 154(b) by 1261 days.

(21) Appl. No.: 10/939,217

(22) Filed: Sep. 13, 2004

(65) Prior Publication Data

US 2006/0059076 A1    Mar. 16, 2006

(51) Int. Cl.
*G06Q 40/00* (2006.01)
(52) U.S. Cl. .................. 705/36 R; 705/38; 705/35; 709/223; 709/219
(58) Field of Classification Search .......... 705/35, 705/36 R; 709/223
See application file for complete search history.

(56) References Cited

U.S. PATENT DOCUMENTS

| | | | | |
|---|---|---|---|---|
| 4,554,418 | A * | 11/1985 | Toy ........................... | 379/88.01 |
| 5,920,700 | A * | 7/1999 | Gordon et al. ............... | 709/226 |
| 5,963,936 | A * | 10/1999 | Cochrane et al. ............. | 1/1 |
| 6,182,061 | B1 * | 1/2001 | Matsuzawa et al. .......... | 707/737 |
| 6,236,980 | B1 * | 5/2001 | Reese ........................ | 705/36 R |
| 6,278,982 | B1 * | 8/2001 | Korhammer et al. ........ | 705/36 R |
| 6,324,525 | B1 * | 11/2001 | Kramer et al. ................ | 705/40 |
| 6,631,402 | B1 * | 10/2003 | Devine et al. ................ | 709/217 |
| 6,735,580 | B1 * | 5/2004 | Li et al. ....................... | 706/21 |
| 6,789,125 | B1 * | 9/2004 | Aviani et al. ................. | 709/238 |
| 6,799,319 | B2 * | 9/2004 | Van Loo ...................... | 719/328 |
| 6,810,042 | B1 * | 10/2004 | Naumann et al. ............ | 370/412 |
| 6,886,103 | B1 * | 4/2005 | Brustoloni et al. ........... | 726/15 |
| 6,892,186 | B1 * | 5/2005 | Preist .......................... | 705/37 |
| 6,895,005 | B1 * | 5/2005 | Malin et al. .................. | 370/389 |
| 6,931,418 | B1 * | 8/2005 | Barnes ........................ | 707/776 |
| 6,944,128 | B2 * | 9/2005 | Nichols ....................... | 370/235 |
| 6,947,388 | B1 * | 9/2005 | Wagner ....................... | 370/252 |
| 7,035,819 | B1 * | 4/2006 | Gianakouros et al. ........ | 705/37 |
| 7,051,106 | B2 * | 5/2006 | Grobler et al. ............... | 709/228 |
| 7,113,924 | B2 * | 9/2006 | Fishbain ...................... | 705/37 |
| 7,165,044 | B1 * | 1/2007 | Chaffee ....................... | 705/37 |
| 7,231,455 | B2 * | 6/2007 | Marejka et al. .............. | 709/233 |
| 7,246,093 | B1 * | 7/2007 | Katz ............................. | 705/37 |
| 7,315,849 | B2 * | 1/2008 | Bakalash et al. ............. | 707/2 |

(Continued)

OTHER PUBLICATIONS

The Bond Market Associations's Fixed Income Protocols Initiative, TBA Mortgage-Backed Securities Draft Business Practices Documentation in Plain English, The Bond Market Associaton, 2001 (MBS).*

(Continued)

*Primary Examiner*—Ella Colbert
*Assistant Examiner*—Chika Ojiaku
(74) *Attorney, Agent, or Firm*—Kelley Drye & Warren LLP

(57) ABSTRACT

An execution concentrator is interposed in a communications network for handling information concerning securities transactions or the like, that concentrator acting to transmit transaction information to the trader or the like at such times and in such details as may be most convenient or efficient to the recipient, independently of the timing and details of the actual transaction.

16 Claims, 2 Drawing Sheets

U.S. PATENT DOCUMENTS

| | | | |
|---|---|---|---|
| 7,428,506 B2* | 9/2008 | Waelbroeck et al. | 705/37 |
| 7,475,046 B1* | 1/2009 | Foley et al. | 705/74 |
| 7,487,125 B2* | 2/2009 | Littlewood | 705/37 |
| 7,500,010 B2* | 3/2009 | Harrang et al. | 709/233 |
| 7,571,129 B2* | 8/2009 | Ebert | 705/36 R |
| 7,617,150 B2* | 11/2009 | Littlewood | 705/37 |
| 2002/0010672 A1* | 1/2002 | Waelbroeck et al. | 705/37 |
| 2002/0032640 A1* | 3/2002 | LaFore et al. | 705/37 |
| 2002/0052827 A1* | 5/2002 | Waelbroeck et al. | 705/37 |
| 2002/0095362 A1* | 7/2002 | Masand et al. | 705/35 |
| 2002/0107748 A1* | 8/2002 | Boies et al. | 705/26 |
| 2002/0116315 A1* | 8/2002 | Grey et al. | 705/37 |
| 2002/0120918 A1* | 8/2002 | Aizenbud-Reshef et al. | 717/127 |
| 2002/0194100 A1* | 12/2002 | Choban et al. | 705/36 |
| 2003/0028456 A1* | 2/2003 | Yolles | 705/35 |
| 2003/0135639 A1* | 7/2003 | Marejka et al. | 709/232 |
| 2003/0149646 A1* | 8/2003 | Chen et al. | 705/35 |
| 2003/0152096 A1* | 8/2003 | Chapman | 370/412 |
| 2003/0177082 A1* | 9/2003 | Buckwalter | 705/36 |
| 2003/0225673 A1* | 12/2003 | Hughes et al. | 705/37 |
| 2004/0002913 A1* | 1/2004 | Breen et al. | 705/37 |
| 2004/0034591 A1* | 2/2004 | Waelbroeck et al. | 705/37 |
| 2004/0054610 A1* | 3/2004 | Amstutz et al. | 705/36 |
| 2004/0059666 A1* | 3/2004 | Waelbroeck et al. | 705/37 |
| 2005/0125326 A1* | 6/2005 | Nangalia et al. | 705/37 |
| 2005/0131830 A1* | 6/2005 | Juarez et al. | 705/51 |
| 2005/0160024 A1* | 7/2005 | Soderborg et al. | 705/37 |
| 2005/0192890 A1* | 9/2005 | Wallman | 705/37 |
| 2005/0246263 A1* | 11/2005 | Ogg et al. | 705/37 |
| 2005/0273419 A1* | 12/2005 | Ogg et al. | 705/37 |
| 2006/0085247 A1* | 4/2006 | Gatto et al. | 705/10 |
| 2008/0262877 A1* | 10/2008 | Hargroder | 705/4 |
| 2010/0004999 A1* | 1/2010 | DePetris et al. | 705/14.71 |

OTHER PUBLICATIONS

Stephanie M. Monaco, Lawrence P. Standis, Current Issues Relating to Investment Adviser Trade Aggregation and Allocation, Glasser LegalWorks, 2000 (Trade Aggregation).*

* cited by examiner

SYSTEM FOR AGGREGATING EXECUTIONS IN A COMMUNICATION NETWORK FOR SECURITIES TRANSACTIONS AND THE LIKE

FIELD OF THE INVENTION

The present invention relates to communication networks utilized for the transmission of orders and execution reports concerned with securities trading and the like and more specifically to such a network which reduces the frequency with which partial executions of orders are reported back to the source or supervisor of those orders.

BACKGROUND OF THE INVENTION

Markets have existed for centuries which allow people to buy and sell financial instruments (e.g., stocks, futures, options, commodities, etc.) from one another. Today, examples of these markets in the United States are: The New York Stock Exchange ("NYSE"), The National Association of Security Dealers Automated Quotation ("NASDAQ"), and The American Stock Exchange ("AMEX"). For one example, these modern securities markets facilitate the exchange of over two billion shares of stock every business day.

When an investor or trader places a large buy or sell order in the securities market, it will rarely be executed in one lot that entirely fills the order. Depending on the executing venue, a particular order may instead be executed in smaller portions, sometimes very small portions, which accumulate to eventually fill the order. As the order is filled piecemeal in the market, execution reports will be generated for each portion.

This process creates problems for the trader, who will ordinarily see a constant stream of trivially-sized execution updates on his screen, or have operation of an automated information management system overloaded by the sheer quantity of executions, making it more difficult to keep track of significant events in an order's life by "drowning out" the important information, or causing the system to perform poorly and get behind with displaying the order status in real time.

Accordingly, what is needed is a reduction of the number of execution reports that the trader or the management system sees in any given period of time, thereby reducing the distraction to which the trader is exposed or the number of updates that the order management system needs to process, while still maintaining the trader's overview of how the order is being executed in the market.

SUMMARY OF THE INVENTION

The present invention is a system for reducing the number of execution messages that a trader sees, or the number of execution messages transmitted to an order management system, in a given period of time, and for getting the execution reports to the order issuer in a timely manner while maximizing the efficiency with which said execution reports may be handled.

Buy or sell orders are sent to the executing venue by traders, typically using an order management system to keep track of the orders. Execution reports and other notifications of the orders' status such as cancellation etc. (hereinafter generically termed "original execution reports") are sent back from the market in response to specific sell or buy orders placed by the trader. In accordance with this invention, the original execution reports sent from the market by a sending means (hereinafter generically termed "sending means") are intercepted by the interecepting means (hereinafter generically termed "intercepting means) before they reach or within the trader's order management system (hereinafter generically termed "receiving means") so the trader is not necessarily notified of the arrival of each execution report immediately. Instead, the execution reports are accumulated, and a synthetic execution report containing a summary of the executed quantity and price from a number of original execution reports is generated at intervals based on a selected parameter such as, for example, a given quantity of the order having been executed in the market, a given dollar value of the order having been executed in the market, a given time period having elapsed, or a combination of such parameters. Other parameters that control the transmission of synthetic execution reports may be employed as desired.

The specific information in each synthetic execution reports may also be varied, as, for example, a synthetic execution report may comprise only the executed quantity of the relevant financial instrument and/or the weighted average dollar value of all of the executions in the original execution reports, or it may comprise complete financial details of all the original execution reports that the synthetic execution report is based on. In the former case, the complete financial details of the original execution reports may be transmitted to the receiving means at some later time, as every three hours, or when the market trading day comes to the close, or when traffic on the network has otherwise become relatively low in intensity. All of this has the effect of optimally controlling the accumulation process so that the trader can select and vary at will, as the occasion demands: (a) the accumulated quantities of executions in the original execution reports or data that should trigger an update on his screen, and/or (b) the elapsed time period between updates. In addition, the intercepting means can keep track of when the buy or sell order has been completely filled and then provide to the trader a final complete update of the order status at that point in time.

When the receiving means is in the form of an order management system the accumulation rules described above will also be valuable in reducing the number of execution reports that the order management system needs to process at peak times, thus preventing information interruption or delay that might otherwise be caused by an order management system being incapable of keeping up with the flow of execution reports in real time.

While the system of the present invention may be capable, as described above, of aggregating large numbers of original execution reports into a smaller number of synthetic execution reports, with those synthetic execution reports being transmitted to the receiving means depending on parameters as described above, the system may also, if desired, accumulate the original execution reports for a given period of time, such as a trading day or a number of hours, with those accumulated original execution reports being transmitted to the receiving means in one large batch at the selected time.

It may be noted that while the intercepting means of the present invention may be located at or incorporated into the sending means or the receiving means, it is particularly well adapted to be inserted into the communications system that exists between the sending and receiving means so that the intercepting means may be provided, operated and supervised independently of the sending means and receiving means respectively.

DESCRIPTION OF THE PREFERRED EMBODIMENTS

As has been indicated, when a trader wishes to carry out a securities transaction the actual transaction (sale or purchase) is carried out at the appropriate market in which the transaction has been consummated, the appropriate entities at the market advise the trader of the details of the transaction (usually the number of units of the particular financial instrument being traded and the unit price at which the sale was consummated). As has been pointed out, frequently a given order cannot be consummated in one transaction, usually because the order quantity is large or the demand for such financial instruments at any one place or time is not sufficiently great. In such a situation, the plurality of individual transactions required to complete the order will be spread out over a period of time, often an appreciable period of time, sometimes involving several days or weeks. Moreover, a given trader, whether an individual or an automated system, will at any point in time have a large number of different orders in the process of being completed, adding to the complexities of the trader's information-handling responsibilities. Thus the trader, individual or system, is during trading hours the recipient of a large number of original execution reports concerning his outstanding orders which are normally transmitted virtually simultaneously after each such individual transaction has been completed without regard to the capability of the trader at that moment to properly digest and process the information, and without regard to the capability of the order management system to process the information in a timely manner.

Figure 1:
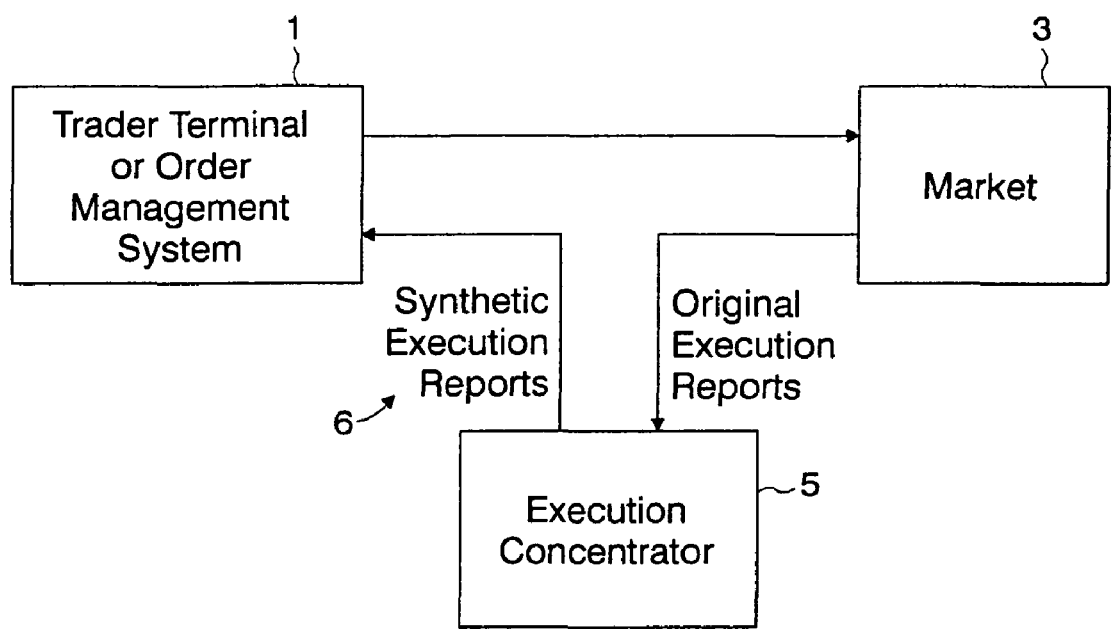
FIG. 1 is a block diagram of the invention inserted in a network between an executing venue (market) and a trader display or receiving means.
Figure 2:
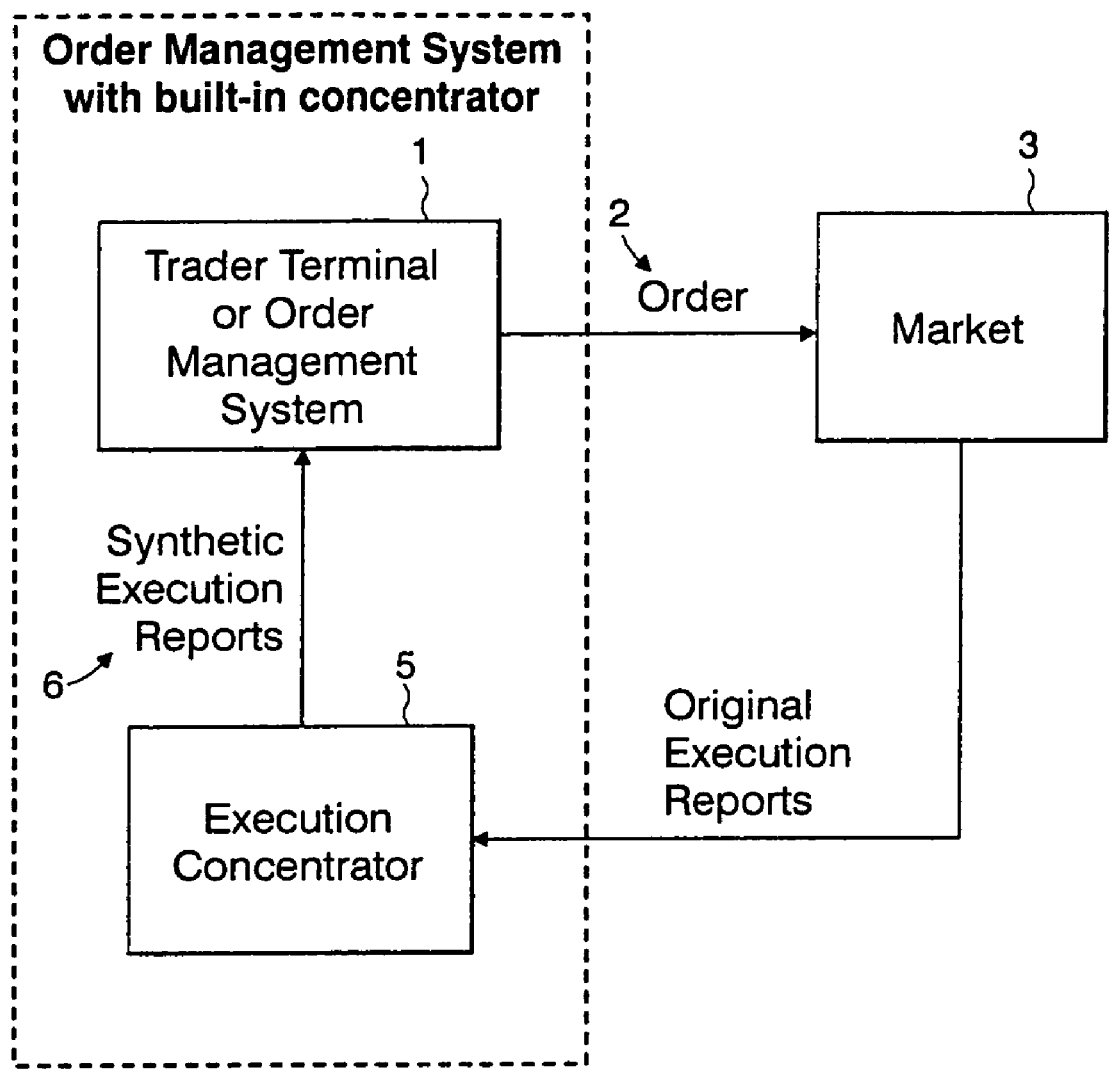
FIG. 2 is a similar block diagram where the invention is inserted inside an order management system.

In accordance with the present invention, and as indicated in the block diagrams of FIGS. 1 and 2, the market 3 where the transaction is consummated will transmit execution reports over an available communications system to the trader's display or order management system or the like 1 where the transactions may be handled in an automatic fashion. According to the present invention, an execution concentrator 5 is operatively interposed into the communications link between the market 3 and the trader display or order management system 1 as the case may be. (The term "receiving means" is here used generically to include both trader display and order information system 1 which may be capable of handling orders in an automatic fashion.) This execution concentrator 5 could be physically located at the market 3 or at the receiving means 1 (as indicated in FIG. 2 by way of example) but it is particularly well adapted to be physically located remote from those entities in the electronic or other communications system which is involved. The execution concentrator 5 in effect intercepts the execution reports sent from the market 3 with respect to a particular identified order 2, stores that information, and conveys that information to the receiving means 1 by means of a synthetic execution report 6 in such a manner so as to facilitate the handling and digesting of that material.

In the first instance, the concentrator may control the time when execution reports are transmitted to the ultimate receiving means. It is in most instances more convenient and efficient for the receiving means 1 to handle execution reports with respect to a particular order by receiving the information for particular transactions which occur over an appreciable period of time in the form of a single synthesized execution report rather than as a series of original execution reports spread out over a period of time. Thus the execution concentrator 5 may store data for individual transactions until a predetermined quantity of the order has executed, or until the dollar value of the accumulated executed quantity has reached a predetermined value, or until a predetermined point in time has passed (every hour, every three hours, the closing time of the trading day, or the like). The execution concentrator 5 may also function to transmit stored information to the receiving means only when the overall traffic on the communications system or to a particular receiving means 1 is sufficiently low. In other words, the time when the stored transaction information at the execution concentrator 5 is conveyed to the receiving means 1 may be chosen to meet the needs of a particular receiving means depending on personal preference or the requirements of particular multiple-transaction orders.

The ability to efficiently handle items of information is not only time-sensitive, as indicated above, but also content-sensitive. A trader or system may not want to deal with details at a given point in time but may want to be kept more or less up-to-date on the broad picture as it is developing. Thus the execution concentrator 5 is preferably programmed not only as to when stored batches of information are to be transmitted to the receiving means but also as to what information is transmitted at any given time. For example, assuming that the concentrator will transmit a synthetic execution report only when at least two thousand units have been executed in the market, the concentrator may send to the receiving means, at that point in time, a synthetic execution report of the total number of units involved and the average price per unit for those transactions, thereafter transmitting details of each original execution report for those transactions at some later point in time, such as after the close of trading. The system is thus adapted to give to the receiving means the information that it needs at the time and in the fashion most appropriate, thereby reducing the frequency of updates that the receiving means must manage, and preventing information overload.

The parameter determining the data content of the synthesized execution information, like the parameter setting the timing of transmission of stored data, may be adjusted at will to correspond to the needs or desires of a particular receiving means or to adapt to changing operational situations.

Whatever the normal mode of operation of the execution concentrator 5, it may be desirable to provide certain overriding operational rules. For example, if the normal parameter calls for a synthetic execution report to be sent whenever a particular condition has occurred (e.g., a specific executed quantity, or a specific dollar value of executed quantity) the concentrator may optionally be programmed to transmit all of the remaining information, in whatever details are required, for example, whenever the order in question has been completely filled, or whenever the market closes for the day, even though that particular condition has not yet been satisfied.

As will be apparent from the above, the execution concentrator 5 of the present invention will receive the original execution reports sent from the market 4. (The market 3 as here disclosed may be constituted by one venue or several venues, as the case may be.) The concentrator 5 is programmed to recognize and store those execution reports addressed to a particular receiving means 1 and involving a particular buy or sell order identified by the receiving means 1 as warranting the action of the concentrator 5. (It is contemplated that only those orders involving a large number of individual transactions for consummation would be involved.) All other execution reports will immediately be forwarded as received (not stored). Hence the receiving means 1 can control how and when it gets the synthetic execution reports and therefore the information that it needs to fit the desires and needs of the moment and to maximize efficiency of operation at the receiving means.

While but a limited number of embodiments of the present invention have been here specifically set forth, it will be appreciated that many variations may be made therein, all without departing from the spirit of the invention as defined in the following claims:

What is claimed is:

1. A method for reducing the number of partial original execution reports being conveyed by a communications system for a single security, said method comprising:

intercepting, by a computer positioned between a market and a trading system, a streaming of partial original execution reports for said single security over a definable time period, each of said streaming of partial original execution reports resulting from an order for said single security;

storing said streaming of partial original execution reports;

aggregating said streaming of partial original execution reports and synthesizing one or more synthetic execution reports comprising predetermined parameters; and transmitting said one or more synthetic execution reports when prescribed conditions are satisfied and at a slower rate than would be issued as said partial original execution reports.

2. The method, in accordance with claim 1, wherein said prescribed conditions comprise a low level of execution report traffic on said communications system.

3. The method, in accordance with claim 1, wherein said predetermined parameters comprise order status, total executed quantity and value of said streaming of partial original execution reports.

4. The method, in accordance with claim 1, wherein said prescribed conditions comprise a predetermined time.

5. The method, in accordance with claim 1, wherein said prescribed conditions comprise reception of last of said streaming of partial original execution reports.

6. A system for reducing the number of partial original execution reports being conveyed by a communications system for a single security, comprising an execution concentrator which:

intercepts a plurality of partial original execution reports, each of said partial original execution reports resulting from an order for said single security;

stores said partial plurality of original execution reports;

aggregates said plurality of partial original execution reports and synthesizing one or more synthetic execution reports comprising predetermined parameters; and transmits said one or more synthetic execution reports when prescribed conditions are satisfied and at a slower rate than would be issued as said partial original execution reports.

7. The system for reducing the number of partial original execution reports, in accordance with claim 6, wherein said prescribed conditions comprise a low level of execution report traffic on said communications system.

8. The system for reducing the number of partial original execution reports, in accordance with claim 6, wherein said predetermined parameters comprise order status, total executed quantity and value of said plurality of partial original execution reports.

9. The system for reducing the number of partial original execution reports, in accordance with claim 6, wherein said prescribed conditions comprise a predetermined time.

10. The system for reducing the number of partial original execution reports, in accordance with claim 6, wherein said prescribed conditions comprise reception of last of said plurality of partial original execution reports.

11. The system for reducing the number of partial original execution reports, in accordance with claim 6, which is provided, operated and supervised independently of said execution message sending means and receiving means.

12. A computer usable medium having computer readable instructions stored thereon for execution by a processor to perform a method comprising:

intercepting a plurality of partial original execution reports for a single security, each of said original execution reports resulting from an order for said single security;

storing said plurality of partial original execution reports;

aggregating said plurality of partial original execution reports and synthesizing one or more synthetic execution reports comprising predetermined parameters;

transmitting said one or more synthetic execution reports when prescribed conditions are satisfied.

13. The computer usable medium, in accordance with claim 12, wherein said prescribed conditions comprise a low level of execution report traffic on said communications system.

14. The computer usable medium, in accordance with claim 12, wherein said predetermined parameters comprise order status, total executed quantity and value of said plurality of partial original execution reports.

15. The computer usable medium, in accordance with claim 12, wherein said prescribed conditions comprise a predetermined time.

16. The computer usable medium, in accordance with claim 12, wherein said prescribed conditions comprise reception of last of said plurality of partial original execution reports.

* * * * *